May 19, 1964    J. R. ZAZZARA    3,133,746
VEHICLE OCCUPANT GUARD
Filed Nov. 29, 1961    2 Sheets-Sheet 1
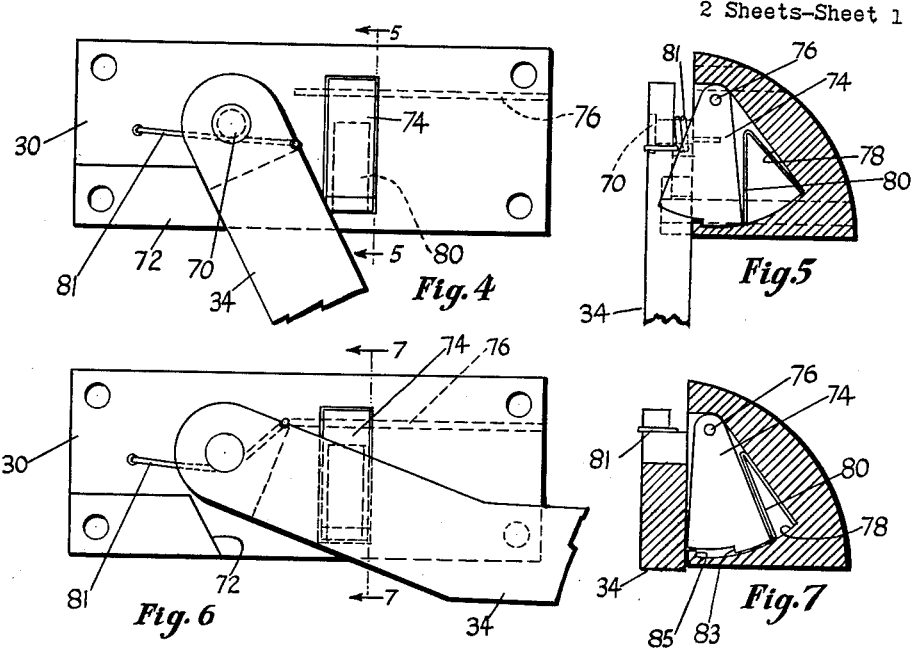
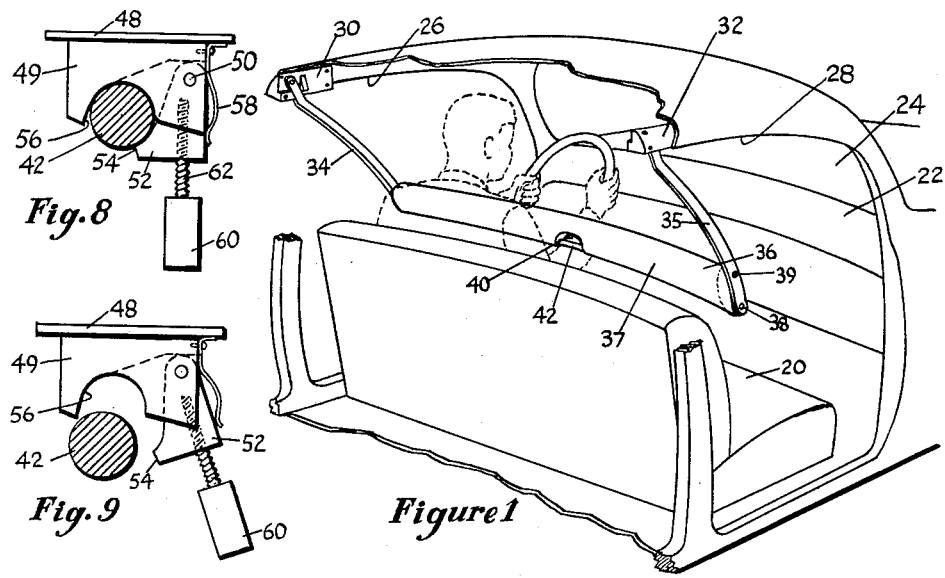
INVENTOR.
Joseph R. Zazzara
BY May 19, 1964  J. R. ZAZZARA  3,133,746
VEHICLE OCCUPANT GUARD
Filed Nov. 29, 1961  2 Sheets-Sheet 2

INVENTOR.
Joseph R. Zazzara
BY

United States Patent Office 3,133,746
Patented May 19, 1964

3,133,746
VEHICLE OCCUPANT GUARD
Joseph R. Zazzara, 302 Albert Road, Syracuse, N.Y.
Filed Nov. 29, 1961, Ser. No. 155,569
3 Claims. (Cl. 280—150)

This invention relates to automotive vehicle safety devices, and more particularly to a seat guard adapted to prevent occupants from being thrown forward on abrupt stoppage of a vehicle due to collision or sudden application of the brakes in avoidance of collision.

The invention is directed to a transverse cushioned member or guard pivotally supported from the upper side frame members of a vehicle body, which may be conveniently moved from active position in front of the upper body portion of occupants of the vehicle front seat to an inactive position above the windshield. More particularly, the invention has to do with the automatic actuation of such a guard in the event of impending collision such that protection to the occupants is instantly afforded prior to collision impact, should the occupants fail to utilize the guard as standard practice during normal driving.

The invention further has to do with inertia means for releasing the guard to move to active position on sudden deceleration, and locking means for releasably securing the guard in active position.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a perspective view with parts broken away of the interior of a vehicle showing the seat guard in protective position;

FIGURE 4 is an enlarged view of the left hand guard pivot, with the guard in protective position;

FIGURE 5 is a transverse section taken on the line 5—5 of FIGURE 4;

FIGURE 6 is an enlarged view of the guard pivot, with the guard in elevated position;

FIGURE 7 is a transverse section taken on the line 7—7 of FIGURE 6;

FIGURE 8 is an enlarged sectional view of the holding latch with guard in elevated position; and FIGURE 9 is an enlarged sectional view of the holding latch in release position.

Figure 2:
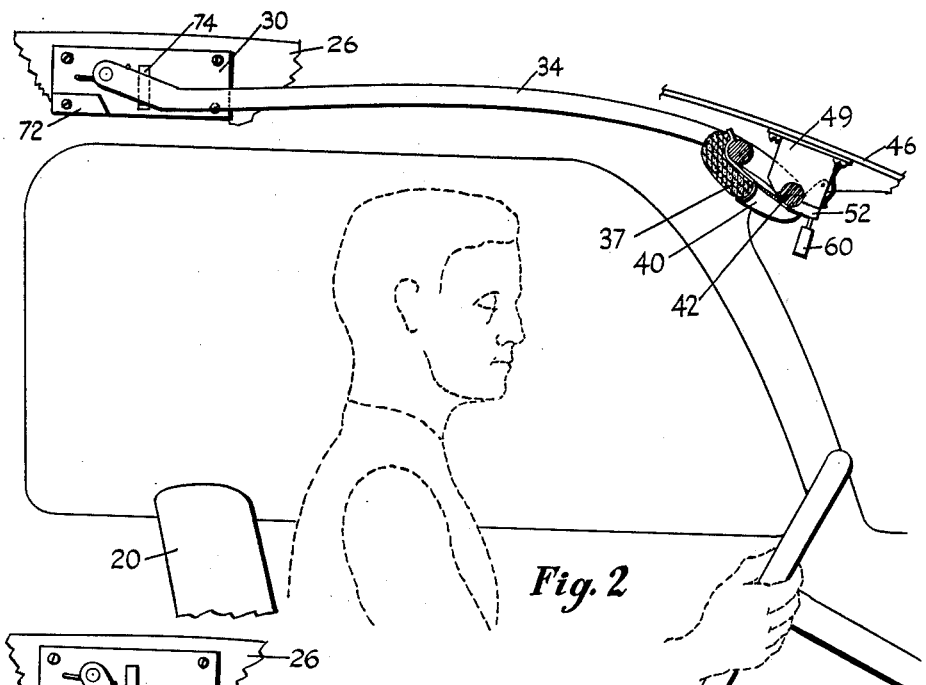
FIGURE 2 is a longitudinal sectional view through the vehicle showing the guard held out of operative position.

Referring to FIGURE 1, there is shown the front bench type seat 20 of a vehicle, the dash 22, windshield 24, and roof frame members 26 and 28 along the sides of the vehicle. Pivotally mounted on pivot blocks 30 and 32 secured to the frame members 26 and 28 is a seat guard 36 having side arms 34 and 35. The seat guard 36 is provided with a cushion 37 extending its length, and mounted on transverse rods 38 and 39. Rod 38 is exposed as at 40 to provide a latch engaging section 42 and hand hold.

Centrally disposed above the windshield 24, upon the vehicle windshield arch frame member 46, see FIGURE 2, is a latch mechanism comprising a base plate 48 having secured thereto a depending socket plate 49 to receive the exposed rod section 42 of the guard 36. Pivotally mounted upon the plate 49, as at 50 is a latch member 52 having a lip 54 adapted to cooperate with the recess socket 56 to receive and hold the guard rod section 42. The latch 52 is urged towards the position shown in FIGURE 8 by a suitable spring, such as the leaf spring 58. The latch member 52 has depending therefrom an inertia weight 60, whose distance below the pivot may be adjustable, as by the threaded stem 62. The weight 60 is adapted to respond to sudden deceleration of the vehicle to release the rod section 42 of the guard from the latch mechanism as is indicated in FIGURE 9, and is so located as to be manually operable for the same purpose, as well as manually operable to open the latch for the lifting of the guard into the latch position indicated in FIGURE 8, and FIGURE 2.

Figure 3:
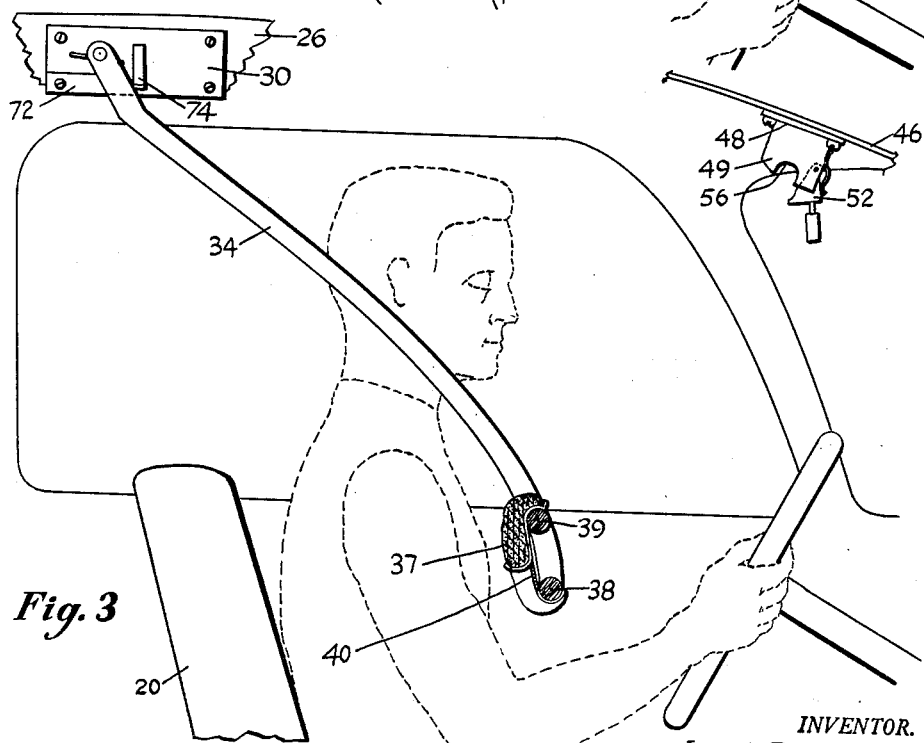
FIGURE 3 is a view similar to FIGURE 2 showing the guard in protective position.

The guide side arms 34 and 35 are pivoted upon the pivot blocks 30 and 32 as at 70, and each pivot block is provided with a shoulder or stop 72 adapted to limit the clockwise swinging movement of the arm 34, as shown in FIGURE 3 to the position there shown. Each block 30 and 32, also is provided with a swing dog 74 pivoted as at 76 in a transverse slot 78 in the blocks 30 and 32, see FIGURES 4-7 inclusive. Each dog 74 is adapted to move by gravity or by action of a V spring 80 into the path of its respective arm 34 or 35, when the guard 36 and arms 34 and 35 are swung to the position shown in FIGURE 3, to hold the guard against forward movement. Each dog is provided with a stop shoulder 83 adapted to engage the lip 85 of the slot 78 to provide a stop. The arms 34 and 35 are each provided at their pivots 70, with a heavy coil spring 81 to urge the arms 34 and 35 to swing to the position shown in FIGURE 3.

The dogs 74 may be depressed within their slots manually to a position flush with the surface of the blocks 30 and 32, or by other suitable means not disclosed, as will be readily understood by those skilled in the art, the dogs being depressed to clear the arms 34 and 35, when it is desired to lift the guard from its position as shown in FIGURE 3, for ultimate latching in its upper position, as shown in FIGURE 2.

It will be seen that the driver and other occupants of the front seat, as soon as entering the car, may operate the latch member 52, using the weight 60 as a convenient handle, to lower the guard 36 with its cushion 37 to the position shown in FIGURE 3.

When so lowered, the dogs 74 assume the locking position as indicated in FIGURE 5. Should the occupants desire to drive without lowering the guard 36, or inadvertently fail to lower the guard 36, any sudden deceleration, such as might occur by a panic application of the brakes prior to impending collision, will cause the weight 60 to swing forward, thereby releasing the guard 36, so that it will immediately swing to the position shown in FIGURE 3, under its weight, and by the torque of the springs 81. Once the guard assumes the position shown in FIGURE 3, it is locked by the dogs 74.

Should the occupants employ the guard under normal driving conditions, it is readily lifted from guard position when the occupants desire to alight from the vehicle, by merely swinging the guard to the upper position, where the exposed rod 42 engages the lip 54 of the latch 52 to swing the same forward, following which the rod 42 is seated in the recess 56 and held in position for ready subsequent use.

It will be seen that the guard nests in the roof and windshield arch structure of the vehicle, and out of the way of passengers or driver entering or leaving the vehicle. At the same time, its pivotal mounting is such as to provide a secure anchorage to the vehicle frame whereby the guard 36 is capable of resisting any tendency of the occupants to be thrown forward or out of the vehicle in the event of panic deceleration or collision.

While a single form of the invention has been illustrated and described, it is to be understood that the invention is not lmited thereto. As various changes in the construction and arrangement may be made without departing from the spirit of the invention, as will be apparent to those skilled in the art, reference will be had to the appended claims for a definition of the limits of the invention.

What is claimed is:

1. A motor vehicle seat guard comprising in combination, a driver seat, a surrounding vehicle body frame structure comprising a seat support, a windshield arch member forward of the seat, and rearwardly extending roof side frame members along opposite sides of the vehicle, a transverse guard member having rearwardly extending side arms pivotally mounted in respect of said side frame members behind the seat, and adapted to swing between an upper position with the guard member nesting adjacent the arch member, and a lower position just forward of the upper body portion of occupants of the seat, means for releasably holding the guard member in its upper position secured to the arch member centrally thereof, and inertia means operatively associated with said holding means and responsive to vehicle deceleration for releasing said holding means and releasing the guard member for movement to its lower position.

2. A motor vehicle seat guard comprising in combination, a driver seat, a surrounding vehicle body frame structure comprising a seat support, a windshield arch member forward of the seat, and rearwardly extending roof side frame members along opposite sides of the vehicle, pivot blocks mounted on said roof side frame members rearwardly of said seat, a transverse guard member having rearwardly extending side arms pivotally mounted upon said side frame pivot blocks, and adapted to swing between an upper position nesting adjacent the arch member, and a lower position forward of the upper body portion of occupants of the seat, means carried by said blocks and adapted to engage said arms for providing a lower position limit and a releasable lock to hold said arms in said lower position, means for releasably holding the guard member in its upper position secured to the arch member, and inertia means operatively associated with said holding means and responsive to vehicle deceleration for releasing said holding means and releasing the guard member for movement to its lower position.

3. A motor vehicle seat guard comprising in combination, a driver seat, a surrounding vehicle body frame structure comprising a seat support, a windshield arch member forward of the seat, and rearwardly extending roof side frame members along opposite sides of the vehicle, pivot blocks mounted on said roof side frame members rearwardly of said seat, a transverse guard member having rearwardly extending side arms pivotally mounted upon said side frame pivot blocks, and adapted to swing between an upper position nesting adjacent the arch member, and a lower position forward of the upper body portion of occupants of the seat, means for resiliently urging said arms and guard toward said lower position, means for releasably holding the guard member in its upper position secured to the arch member, and inertia means operatively associated with said holding means and responsive to vehicle deceleration for releasing said holding means and releasing the guard member for movement to its lower position, and means carried by said blocks and adapted to engage said arms for providing a lower position limit, and a releasable lock to hold said arms in said lower position.

References Cited in the file of this patent

UNITED STATES PATENTS

| | | |
|---|---|---|
| 1,936,251 | McCullough | Nov. 21, 1933 |
| 2,025,822 | Pryor | Dec. 31, 1935 |
| 2,661,221 | Lockwood et al. | Dec. 1, 1953 |
| 2,749,143 | Chika | June 5, 1956 |

FOREIGN PATENTS

| | | |
|---|---|---|
| 1,031,160 | France | Mar. 18, 1953 |